United States Patent [19]

Kumami et al.

[11] Patent Number: 5,075,117

[45] Date of Patent: Dec. 24, 1991

[54] MATERIAL FOR PREVENTING FOODS FROM GATHERING MOLD AND KEEPING THEM FRESH

[75] Inventors: Hiroo Kumami, Asahi; Akio Okamoto, Nishi, both of Japan

[73] Assignee: Kabushiki Kaisha Nasa, Kanagawa, Japan

[21] Appl. No.: 602,381

[22] Filed: Oct. 26, 1990

Related U.S. Application Data

[63] Continuation of Ser. No. 318,559, Mar. 3, 1989, abandoned.

[30] Foreign Application Priority Data

Oct. 4, 1988 [JP] Japan ............................. 63-250650

[51] Int. Cl.$^5$ .................... A61K 33/14; A61K 33/32; A61K 33/14; A61K 31/14
[52] U.S. Cl. ................................ 424/661; 424/640; 424/663; 424/681; 514/642
[58] Field of Search ............... 424/661, 663, 681, 640; 514/642

[56] References Cited

FOREIGN PATENT DOCUMENTS 0058904 4/1985 Japan ................................. 424/661

OTHER PUBLICATIONS

The Merck Index, Tenth Ed, 1983, pp. 551 and 810.
Organic Chemistry, Third Ed, 1976, p. 181, Morrison et al.

*Primary Examiner*—Frederick E. Waddell
*Assistant Examiner*—Zohreh A. Fay
*Attorney, Agent, or Firm*—Jones, Tullar & Cooper

[57] ABSTRACT

A material for keeping foods fresh which essentially comprises an aqueous stabilized chlorine dioxide solution containing potassium permanganate, chlorinated choline and magnesium chloride. The freshness-keeping material is capable of removing ethylene gas and bacteria from foods, and preventing them from gathering mold while being stored, thus keeping them fresh even if they are stored for a long period.

1 Claim, No Drawings

MATERIAL FOR PREVENTING FOODS FROM GATHERING MOLD AND KEEPING THEM FRESH

This is a continuation of co-pending application Ser. No. 07/318,559 filed on Mar. 3, 1989, now abandoned.

BACKGROUND OF THE INVENTION

1. Field of the Invention

The present invention relates to a material for keeping vegetables, fruits, meat, fish and other foods fresh.

2. Description of the Prior Art

Hitherto use has been made of a material containing zeolite, Oya-ishi (stone yielded in Oya, Tochigi Prefecture, Japan), cristobalite and any other substance which is capable of absorbing ethylene gas generated from foods while being stored. Such a freshness-keeping material is found to be useful in removing ethylene gas, which otherwise would expedite the loss of freshness. However, the conventional freshness-keeping material has no capability of preventing foods from getting moldy. Oranges, peaches, strawberries etc. while being stored, easily gather mold, and hence the freshness of the fruits will be lost and accordingly the commercial value is lowered.

SUMMARY OF THE INVENTION

In view of the above one object of the present invention is to provide a material which is capable of removing ethylene gas and at the same time, preventing foods from getting moldy even if they are stored for a long period.

To attain this object a fresh-keeping material according to the present invention has an aqueous stabilized chlorine dioxide solution containing potassium permanganate, chlorinated choline and magnesium chloride absorbed in an absorbent. It permits these ingredients to release a vapor or gas little by little. Their functions are as follows:

1) The stabilized chlorine dioxide has an effect of preventing foods from gathering mold and removing bacteria, and at the same time, of activating the enzyme in the food.
2) Potassium permanganate has an effect of decomposing undesired ethylene gas.
3) The absorbent can absorb the decomposition of the ethylene gas.
4) Chlorinated choline has an effect of causing vitamin effect on the food, thereby activating it.
5) Magnesium chloride functions as an assistant to the stabilized chlorine dioxide, thereby enhancing its capability of preventing foods from gathering mold.

Thus, all ingredients play different but cooperative parts in eliminating the ethylene gas from the food, preventing the food from gathering mold and causing activation of the enzyme in the food, thereby keeping the food fresh even if it is stored for a long period.

Embodiment

Potassium permanganate, chlorinated choline (trimethyl (2-hydroxyethyl) ammonium chloride) and magnesium chloride was dissolved in an aqueous stabilized chlorine dioxide solution. The resulting solution was absorbed in an absorbent. Activated alumina and zeolite may be used as an absorbent. It permits these ingredients to release a vapor or gas little by little. Their functions are as follows:

1) The stabilized chlorine dioxide will be released little by little in the form of vapor or gas, preventing a food from gathering mold, remove bacteria, deodorize the food, and at the same time, activate the enzyme in the food.
2) Potassium permanganate functions to decompose undesired ethylene gas.
3) The absorbent functions to release potassium permanganate etc., and, at the same time, absorb the decomposition of the ethylene gas.
4) Chlorinated choline functions to cause a vitamin effect on the food, thereby activating it.
5) Magnesium chloride functions as an assistant to the stabilized chlorine dioxide, thus enhancing its capability of preventing foods from gathering mold. Also, magnesium chloride controls the water content of the absorbent, thus playing a part in expediting the smooth generation of chloride dioxide gas.

When foods are stored in a container, freshnesskeeping material according to the present invention is put in the container, thereby keeping the foods fresh for a long period by removing ethylene gas which is generated from the foods, removing bacteria from the foods, activating the enzyme in the foods and preventing the foods from gathering mold.

Now, the method of preparing the freshness-keeping material according to the present invention is described:

First, an aqueous stabilized chlorine dioxide solution is prepared by using as a stabilizer an aqueous solution containing sodium percarbonate, sodium bicarbonate or any other inorganic salt (9 or more ph) and by circulating carbon dioxide gas in the stabilizer until the gas is dissolved in the aqueous solution. Then, potassium permanganate, chlorinated choline and magnesium chloride are dissolved in the aqueous stabilized chlorine dioxide solution. The resulting solution is absorbed in an absorbent such as pulverized activated alumina or zeolite.

The freshness-keeping material thus prepared may be used as follows:

1) When fresh oranges, peaches and other fruits or foods are put in a container, the freshness-keeping material may be put together in the container.
2) When fresh potatoes are stored in a storehouse, the freshness-keeping material may be put together in the storehouse.
3) When flower bulbs are transported a long distance, the freshness-keeping material may be put together in a container.
4) The freshness-keeping material may be put in a forcing house to remove ethylen gas.
5) When ethylene gas is generated in the course of purification of a gas mixture, the freshness-keeping material may be used to remove the ethylene gas by decomposing the gas by oxidation and absorb.

As described earlier, the freshness-keeping material is prepared by absorbing in a pulverized absorber an aqueous stabilized chlorine dioxide solution containing potassium permanganate, chlorinated choline and magnesium chloride, but it may be prepared by dissolving such aqueous stabilized chlorine dioxide solution in water, not using any absorber, as seen in the following table:

| ingredients | ratios |
| --- | --- |
| aqueous stabilized chlorine dioxide solution (5% ClO$_2$ stock solution) | 10–20% |
| potassium permanganate | 2–3% |
| magnesium chloride | 1–2% |
| chlorinated choline | 5–10% |
| water | remaining percent |

As is apparent from the above, a freshness-keeping material according to the present invention is capable of removing ethylene gas and bacteria from foods, and preventing them from gathering mold while being stored, thus keeping them fresh even if they are stored for an elongated period.

What is claimed is:

1. A material for keeping foods fresh, consisting of a solution comprising:
   10–20% of an aqueous stabilized chlorine dioxide solution;
   2–3% of potassium permanganate;
   1–2% of magnesium chloride;
   5–10% of chlorinated choline; and
   the remainder of water.

* * * * *